(12) United States Patent
Rogers

(10) Patent No.: US 9,572,387 B2
(45) Date of Patent: *Feb. 21, 2017

(54) HELMET EDGE BAND

(71) Applicant: Artisent, LLC, Simpson, PA (US)

(72) Inventor: David Charles Rogers, Boston, MA (US)

(73) Assignee: ARTISENT, LLC, Simpson, PA (US)

( * ) Notice: Subject to any disclaimer, the term of this patent is extended or adjusted under 35 U.S.C. 154(b) by 400 days.

This patent is subject to a terminal disclaimer.

(21) Appl. No.: 14/132,504

(22) Filed: Dec. 18, 2013

(65) Prior Publication Data

US 2014/0101811 A1 Apr. 17, 2014

Related U.S. Application Data

(63) Continuation of application No. 12/205,323, filed on Sep. 5, 2008, now Pat. No. 8,661,572.

(60) Provisional application No. 60/967,939, filed on Sep. 6, 2007.

(51) Int. Cl.
| | |
|---|---|
| *A42B 3/04* | (2006.01) |
| *F41H 1/08* | (2006.01) |
| *A42B 3/00* | (2006.01) |
| *A42B 3/12* | (2006.01) |
| *F41H 1/04* | (2006.01) |
| *B29C 70/30* | (2006.01) |

(52) U.S. Cl.
CPC ............... *A42B 3/0406* (2013.01); *A42B 3/00* (2013.01); *A42B 3/04* (2013.01); *A42B 3/125* (2013.01); *B29C 70/30* (2013.01); *F41H 1/04* (2013.01); *F41H 1/08* (2013.01)

(58) Field of Classification Search
CPC .................................. A41D 13/00; A42B 3/06
USPC ....................................................... 2/455, 6.6
See application file for complete search history.

(56) References Cited

U.S. PATENT DOCUMENTS

| | | | |
|---|---|---|---|
| 2,423,076 A | 7/1947 | Daly | |
| 2,581,007 A | 1/1952 | Douglas et al. | |
| 2,688,747 A | 9/1954 | Marx | |
| 3,018,210 A | 1/1962 | Frieder et al. | |
| 3,082,427 A | 3/1963 | Zbikowski | |
| 3,116,490 A | 1/1964 | Zbikowski | |
| 3,465,363 A | 9/1969 | Raney | |
| 3,467,964 A | 9/1969 | Hannan | |
| 3,577,564 A | 5/1971 | Hill | |
| 3,577,565 A | 5/1971 | Feldmann et al. | |
| 3,672,365 A | 6/1972 | Morgan | |
| 3,761,959 A | 10/1973 | Dunning | |
| 3,784,984 A | 1/1974 | Aileo | |

(Continued)

FOREIGN PATENT DOCUMENTS

| | | |
|---|---|---|
| DE | 3614068 A1 | 10/1987 |
| EP | 0650333 B1 | 5/1995 |

(Continued)

*Primary Examiner* — Gloria Hale
(74) *Attorney, Agent, or Firm* — Morgan, Lewis & Bockius LLP

(57) ABSTRACT

An improved edge band for a protective helmet includes a flexible woven-fiber elongate band applied to the edge of a helmet shell. The elongate band is positioned such that side edges of the elongate band extend in intimately conforming contact along a surface contour of the helmet shell. The edge band includes a matrix material in contact with fibers of the elongate band.

16 Claims, 5 Drawing Sheets

(56) References Cited

U.S. PATENT DOCUMENTS

| | | |
|---|---|---|
| 3,786,519 A | 1/1974 | Aileo |
| 3,806,949 A | 4/1974 | Bushman |
| 3,868,727 A | 3/1975 | Paschall |
| 3,886,596 A | 6/1975 | Franklin et al. |
| 3,935,044 A | 1/1976 | Daly et al. |
| 3,946,441 A | 3/1976 | Johnson |
| 3,956,447 A | 5/1976 | Denommee et al. |
| 3,994,022 A | 11/1976 | Villari et al. |
| 4,024,587 A | 5/1977 | Barford et al. |
| 4,044,399 A | 8/1977 | Morton |
| 4,229,836 A | 10/1980 | Stinger |
| 4,271,649 A | 6/1981 | Belanger |
| 4,453,277 A | 6/1984 | Durand et al. |
| 4,455,687 A | 6/1984 | Johansson |
| 4,466,138 A | 8/1984 | Gessalin |
| 4,538,303 A | 9/1985 | Schnitzler et al. |
| 4,550,044 A | 10/1985 | Rosenberg et al. |
| 4,719,462 A | 1/1988 | Hawkins |
| 4,953,234 A | 9/1990 | Li et al. |
| 5,018,220 A | 5/1991 | Lane et al. |
| 5,267,353 A | 12/1993 | Milligan |
| 5,269,025 A | 12/1993 | Broersma |
| 5,345,614 A | 9/1994 | Tanaka et al. |
| 5,519,895 A | 5/1996 | Barnes, Jr. |
| 5,555,570 A | 9/1996 | Bay, Jr. |
| 5,561,866 A | 10/1996 | Ross et al. |
| 5,572,749 A | 11/1996 | Ogden |
| 5,603,120 A | 2/1997 | Gifford |
| 5,619,756 A | 4/1997 | Garneau et al. |
| 5,675,843 A | 10/1997 | Grim et al. |
| 5,749,096 A | 5/1998 | Fergason et al. |
| 5,765,229 A | 6/1998 | McLeod et al. |
| 5,833,796 A | 11/1998 | Matich et al. |
| 5,857,215 A | 1/1999 | Fergason et al. |
| 5,914,661 A | 6/1999 | Gross |
| 5,937,446 A | 8/1999 | Fallert et al. |
| 5,960,470 A | 10/1999 | Bachner, Jr. |
| 6,154,889 A | 12/2000 | Moore, III et al. |
| 6,159,324 A | 12/2000 | Watters et al. |
| 6,277,463 B1 | 8/2001 | Hamilton et al. |
| 6,332,390 B1 | 12/2001 | Lyons |
| 6,493,880 B1 | 12/2002 | Lo |
| 6,546,559 B1 | 4/2003 | Bronson |
| 6,644,308 B2 | 11/2003 | Kalhok et al. |
| 6,910,228 B2 | 6/2005 | Tanaka et al. |
| 7,096,512 B2 | 8/2006 | Blair et al. |
| 7,140,049 B2 | 11/2006 | Lang-Ree et al. |
| 7,284,470 B2 | 10/2007 | Huber et al. |
| 7,631,365 B1 | 12/2009 | Mahan |
| 7,708,852 B2 | 5/2010 | Busch |
| 8,661,572 B2 * | 3/2014 | Rogers ............... A42B 3/04 2/410 |
| 2001/0053432 A1 | 12/2001 | Hamilton et al. |
| 2002/0174481 A1 | 11/2002 | Tremblay-Lutter et al. |
| 2005/0253294 A1 | 11/2005 | Takano et al. |
| 2006/0031975 A1 | 2/2006 | Hersick |
| 2006/0117463 A1 | 6/2006 | Spinelli |
| 2006/0185061 A1 | 8/2006 | Wakefield |
| 2008/0086793 A1 | 4/2008 | Higgins |
| 2008/0128430 A1 | 6/2008 | Kovach et al. |
| 2009/0155511 A1 | 6/2009 | Marissen |

FOREIGN PATENT DOCUMENTS

| | | |
|---|---|---|
| EP | 1260247 A1 | 11/2002 |
| EP | 1360909 A1 | 11/2003 |
| GB | 2098852 A | 12/1982 |
| JP | 63062715 A | 3/1988 |
| RU | 2128457 C1 | 4/1999 |
| WO | 8901744 | 3/1989 |
| WO | 9211780 A1 | 7/1992 |
| WO | 9321014 | 10/1993 |
| WO | 9737553 A1 | 10/1997 |
| WO | 0217740 A1 | 3/2002 |
| WO | 02076253 A1 | 10/2002 |
| WO | 2005009159 A2 | 2/2005 |
| WO | 2007059575 A1 | 5/2007 |

* cited by examiner

HELMET EDGE BAND

CROSS-REFERENCE TO RELATED APPLICATIONS

This application is a continuation of U.S. patent application Ser. No. 12/205,323 filed on Sep. 5, 2008 which claims priority to and the benefit of U.S. provisional patent Application No. 60/967,939, filed Sep. 6, 2007, each of which is incorporated herein by reference in its entirety.

TECHNICAL FIELD

In various embodiments, the invention relates to safety helmets, and more particularly to an improved edge band for the perimeter of a helmet shell.

BACKGROUND

Helmets used to provide head protection may be worn in a variety of environments and for a variety of purposes, such as for protection against ballistic threats. Helmets that protect against ballistic threats may be formed from layers of woven or linear fibrous materials that are combined with a matrix material and formed into a hemispherical shape. The matrix material bonds with the fibrous materials to form a rigid outer shell for the helmet. Either as part of the forming operation, or once the forming is complete, the excess material on the edge of the helmet is typically trimmed to provide the final shape of the helmet, and an edge band is applied to finish and protect the exposed fibers along the edge of the helmet. The final trimmed shell is usually fitted with liner and retention components to secure the helmet to the wearer's head by means of a flexible chin strap.

The edge band is typically channel shaped and made of a conformal material (e.g. rubber) which is flexible enough to be wrapped around the edge of the helmet when applied by hand using an adhesive to bond it in place. The flexible material of the edge band seals and protects the fibers on the edge of the helmet, preventing entry of moisture or other hazards which might degrade the materials. However, this edge band is not a structural element and does not provide additional strength and/or rigidity to the helmet or improve the ballistic performance of the helmet.

Recent advances in technology resulting from new fiber and matrix materials, as well as new processing techniques, may provide greater performance against ballistic threats, for example by providing the same level of protection at a lighter weight, or providing an increased level of protection at the same weight. This improved performance is partly due to the increased strength of the composite recipe, which can withstand more energy before breaking than previously utilized materials. This results, at least in part, from the ability of these composites to stretch without allowing threats to penetrate and pass through. However, this inherent flexibility is disadvantageous to other performance requirements of the helmet that require a more rigid structure, for example to reduce backface deformation of the shell when struck by ballistic threats, and to dissipate blunt trauma impacts over a larger surface area and provide protection from crushing loads.

SUMMARY OF THE INVENTION

In various embodiments, the present invention relates to improved edge bands for protecting the edge of a ballistic helmet, and methods for manufacturing improved helmets.

Various embodiments of the invention can include an edge band for ballistic helmets that provides stiffness to a helmet shell, such as helmet shells made of composite materials, or at least an edge thereof, which without additional stiffening materials would be unacceptably deformable.

One aspect of the invention includes an edge band for a safety helmet. The edge band includes a flexible woven-fiber elongate band and a matrix material in contact with the fibers of the elongate band. The elongate band intimately conforms to a surface contour of an exposed edge of the safety helmet.

In one embodiment, the matrix material is bonded to, woven into, or embedded within the flexible woven-fiber elongate band. The matrix material may be activated—i.e. rigidified—by methods including, but not limited to, applying heat, applying a catalyst, or curing the matrix material. In one embodiment, the matrix material bonds the elongate band to the exposed edge of the safety helmet.

The matrix material may include, but is not limited to, an epoxy resin, a polyurethane resin, an unsaturated polyester resin, a thermoset material, or a thermoplastic material. The thermoplastic material may include, for example, polyethylene, polypropylene, nylon, propylene copolymers and other olefin polymers and copolymers. In one embodiment, the flexible elongate band is of the form of a tubular sleeve or a woven strap without frayed edges. The tubular sleeve may include a plurality of carbon fibers extending substantially along an elongate axis thereof. The width of the elongate band may be greater than the thickness of an exposed edge of a helmet shell to which it is to be applied.

Another aspect of the invention includes a safety helmet, such as a ballistic safety helmet, including a helmet shell and an edge band. The edge band includes a flexible woven-fiber elongate band and a matrix material in contact with fibers of the elongate band, wherein an inner edge of the elongate band intimately conforms to and extends upwards along an inner surface contour of the helmet shell and an outer edge of the elongate band intimately conforms to and extends upwards along an outer surface contour of the helmet shell.

In one embodiment, the matrix material is rigidified so as to hold the elongate band in intimately conforming contact with the inner and outer surface contours of the helmet shell when activated. The matrix material may be activated, for example, by applying heat, applying a catalyst, or curing the matrix material. A first distal end of the edge band may overlap with, or abut against, a second distal end of the edge band.

Another aspect of the invention includes a method of providing structural support for a helmet shell. The method includes providing a helmet shell, a flexible woven-fiber elongate band, and a matrix material in contact with the elongate band. The elongate band is positioned over and in intimate conforming contact with an exposed edge of the helmet shell such that an inner edge of the elongate band extends upwards along an inner surface contour of the helmet shell and an outer edge of the elongate band extends upwards along an outer surface contour of the helmet shell. The elongate band may be held in place while the matrix material is activated (i.e. changed from a flexible to a rigid state), thereby rigidly holding the elongate band in intimate conforming contact with the helmet shell.

The matrix material may be a substantially similar material to a matrix material used in fabricating the helmet shell. The flexible woven-fiber elongate band may be a flexible tubular sleeve and/or a woven strap. The tubular sleeve may include a plurality of woven fibers (e.g. woven carbon fibers) extending substantially along an elongate axis of the tubular sleeve. The matrix material may include a thermoplastic fiber woven together with the carbon fibers of the elongate band. In one embodiment, the matrix material is contacted with the elongate band prior to positioning the elongate band over the exposed edge of the helmet shell. In an alternative embodiment, the matrix material is contacted with the elongate band after positioning the elongate band over the exposed edge of the helmet shell.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

Figure 1:
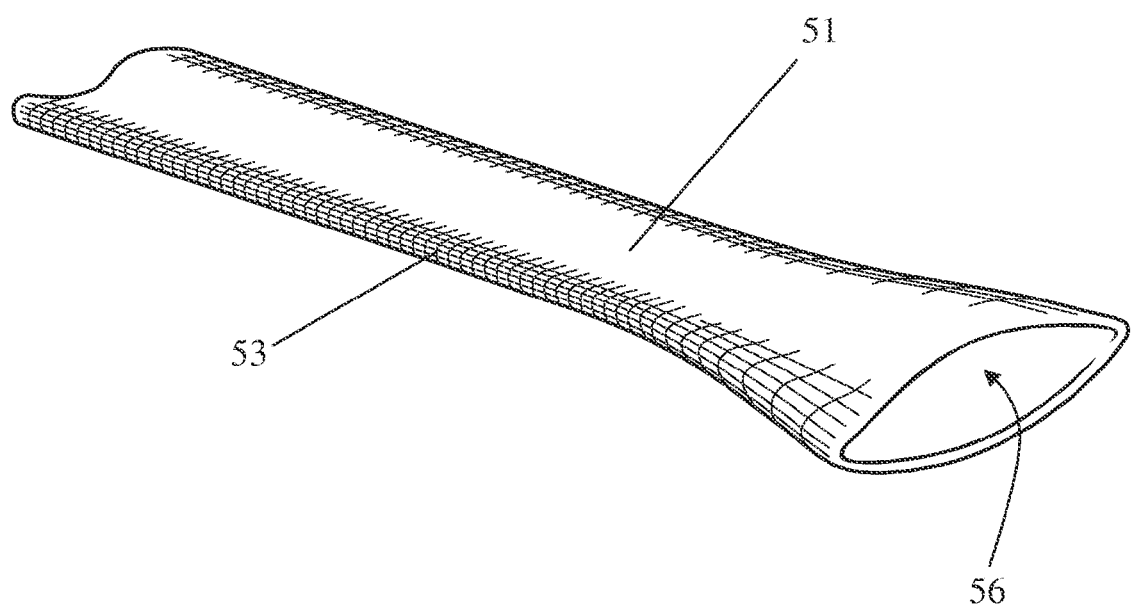
FIG. 1 is a perspective view of a section of carbon fiber biaxial sleeve material for use as an edge band for a ballistic helmet, in accordance with one embodiment of the invention.

In general, embodiments of the present invention relate to safety helmets, such as, but not limited to, ballistic safety helmets. Ballistic helmets are made of materials such as, but not limited to, Kevlar, that have excellent bullet and fragmentation stopping power. Helmets in accordance with various embodiments of the invention may also protect the wearer from non-ballistic injuries, such as flying debris, blunt impact, motor vehicle accidents, or falls.

Embodiments of the invention include an improved edge band for a protective helmet including a flexible woven elongate band of, e.g., a carbon fiber material. The elongate band is applied to the edge of a helmet shell along with a matrix material in contact with fibers of the elongate band. In one embodiment, the elongate band is a hollow, flexible, woven tubular sleeve folded along the elongate axis to provide a band including two layers of material and side edges free from any frayed material or fiber ends. In an alternative embodiment, the elongate band is a flexible strap that is woven to ensure that the side edges are free from any frayed material or fiber ends.

In one embodiment, the elongate band is positioned over the exposed edge of the helmet shell such that the side edges extend upwards on both the inside and the outside of the shell in intimate conformal contact with the contoured inner and outer sides of the helmet shell. The woven fibers of the elongate band may be contacted with a matrix material, such as an epoxy resin, and held in contact with the exposed edge throughout the full perimeter of the helmet shell while the matrix material transitions to a rigid state. In some embodiments, the matrix material for the edge band is the same matrix material used in fabricating the helmet shell.

In one embodiment of the invention, the matrix material is in the form of a fibrous material interwoven with the elongate band. In an alternative embodiment, the matrix material is a liquid that is applied to, and saturated into, the elongate band. In still another alternative embodiment, the matrix material is a liquid or solid material coated onto the elongate band either prior to, or after, application of the elongate band to the edge of the helmet shell. The matrix material may bond the elongate band to the helmet shell. Alternatively, the matrix material may be activated while holding the elongate band against the helmet shell to produce an edge band which is rigidly held in intimately conforming contact with the helmet shell, with or without actually bonding the surface of the elongate band directly to the helmet shell.

The matrix material may be activated (i.e. caused to transition from a flexible to a rigid state to hold the elongate band rigidly against the edge of the helmet shell) by methods including, but not limited to, applying heat, applying cooling, applying a catalyst, and/or curing the matrix material, depending upon the specific material(s) used. The matrix material may or may not exhibit adhesive properties, depending upon the particular application.

In one embodiment, the matrix material changes from a flexible to rigid state to bond with the structural fibers of the elongate band and, in some embodiments, bond the elongate band to the edge of the helmet. Suitable matrix materials include, but are not limited to, epoxy resins, polyurethane resins, polyethylenes, polypropylenes and other olefin polymers and copolymers, an unsaturated polyester resin, a thermoset material, or a thermoplastic material. The matrix material may be a dual or multi-component adhesive consisting of two or more resins or a resin and a hardener, crosslinker, activator or catalyst that when combined react and cure into a polymerized compound or bond. The matrix material may alternatively be a thermoset material that changes from a flexible to rigid state upon application of heat or heat and pressure.

In one embodiment, the matrix material is impregnated into the fibers of the elongate band in a liquid state and then cured to bond the fibers together and hold the elongate band against the helmet edge in intimate conforming contact (with or without adhesion to the helmet edge). Alternatively the matrix material may be a thermoplastic that becomes pliable when heated and rigid once cooled. The thermoplastic matrix materials may take the form of fibers integrally woven together with the structural fiber of the elongate band, or a powder that is applied to (e.g. coated onto or injected into) the elongate band. After being positioned on the edge of the helmet shell, the combination of structural fiber and thermoplastic matrix in the elongate band may be heated to melt the matrix material. The thermoplastic also may be applied as a molten liquid injected into a mold containing the elongate band and helmet in a process referred to as "co-molding."

An exemplary edge band, including an elongate band 51 formed from a carbon-fiber biaxial sleeve, is shown in FIG. 1. The biaxial fiber sleeve consists of fiber woven or knitted at an angle relative to the axis of the sleeve (such as, but not limited to, 45 degrees). Suitable carbon-fiber biaxial materials, as well as other appropriate braided fabric materials useful in connection with the invention, are available from A&P Technology, Inc., of 4595 East Tech Drive, Cincinnati, Ohio under the trade name Gammasox™. The braided fabric may be substantially similar to that often conventionally used to cover cylindrical components. The carbon fibers 53 are woven into a tubular shape such that the fiber ends are only exposed at the opening 56 at the distal ends of the elongate band 51.

Figure 2A:
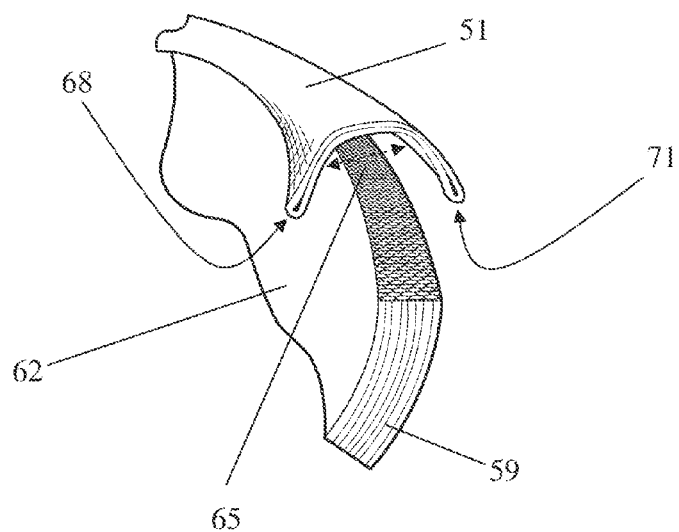
FIG. 2a is a schematic perspective view of the carbon fiber biaxial sleeve material of FIG. 1 being applied to the edge of a ballistic helmet shell, in accordance with one embodiment of the invention.

FIG. 2a shows a piece of elongate band 51 being positioned over the edge 59 of a ballistic helmet shell 60. The elongate band 51 is folded over and formed into an open channel 65 which is placed over the edge 59 of the helmet shell 60. The inner side edge 68 of the elongate band 51 is placed in intimately conforming contact with the curved contour of the inner wall 62 of the shell 60, while the outer side edge 71 of the elongate band 51 is placed in intimately conforming contact with the curved contour of the outer wall 63 of the shell 60.

Figure 2B:
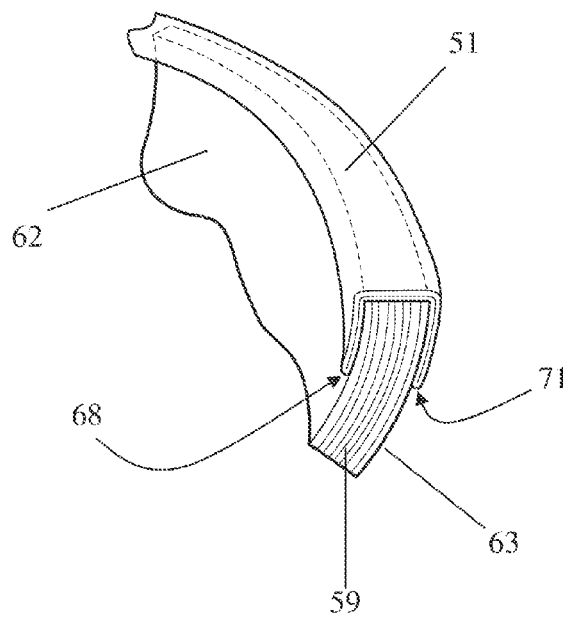
FIG. 2b is a schematic perspective view of the carbon fiber biaxial sleeve material of FIG. 2a after application to the edge of the ballistic helmet shell.

FIG. 2b shows the elongate band 51 after placement thereof on the edge 59 of the ballistic helmet shell 60. After placement, and after holding the elongate band 51 in position until the matrix material (e.g. epoxy resin) has cured, the elongate band 51 intimately conforms to the surface contour of the edge of the helmet shell 60 along both its inner and outer sides and over the shell edge itself. The inner edge 68 of the elongate band 51 intimately conforms to the concave curved inside wall 62 of the helmet shell 60. Similarly, the outer edge 71 of the elongate band 51 intimately conforms to the convex curve of the outside wall 63 of the shell 60. This intimate conformal contact secures the elongate band 51 to the edge of the helmet shell 60, thereby strengthening and protecting the helmet edge 59.

Figure 2C:
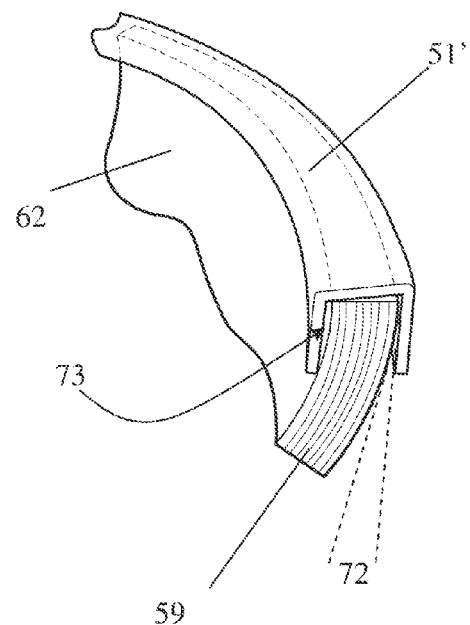
FIG. 2c is a schematic perspective view of a prior art molded or pre-fabricated edge band affixed to the edge of a ballistic helmet shell.

In contrast, prior art methods of providing an edge band for a helmet shell fail to intimately conform to the shell edge. An exemplary prior art molded edge band 51' is shown in FIG. 2c. Here, the side walls of the edge band 51' are parallel or slightly drafted outward, e.g., as a result of the molding operation. As a result, upon placement onto the helmet shell 60, an internal gap 73 is created by the curvature of the inside wall 62 of the helmet shell 60 and the straight side-wall of the edge band 51'. Similarly a space 72 remains between the edge band 51' and the outside of the helmet shell 60. This space 72 may be filled with an adhesive, but the result may still be a relatively weak physical structure that provides limited structural support to the helmet edge 59. The pre-molded edge band 51' also produces a step between the helmet and edge band surfaces that may leave the edge band 51' undesirably exposed to damage, while also impairing the aesthetics of the helmet.

Figure 3:
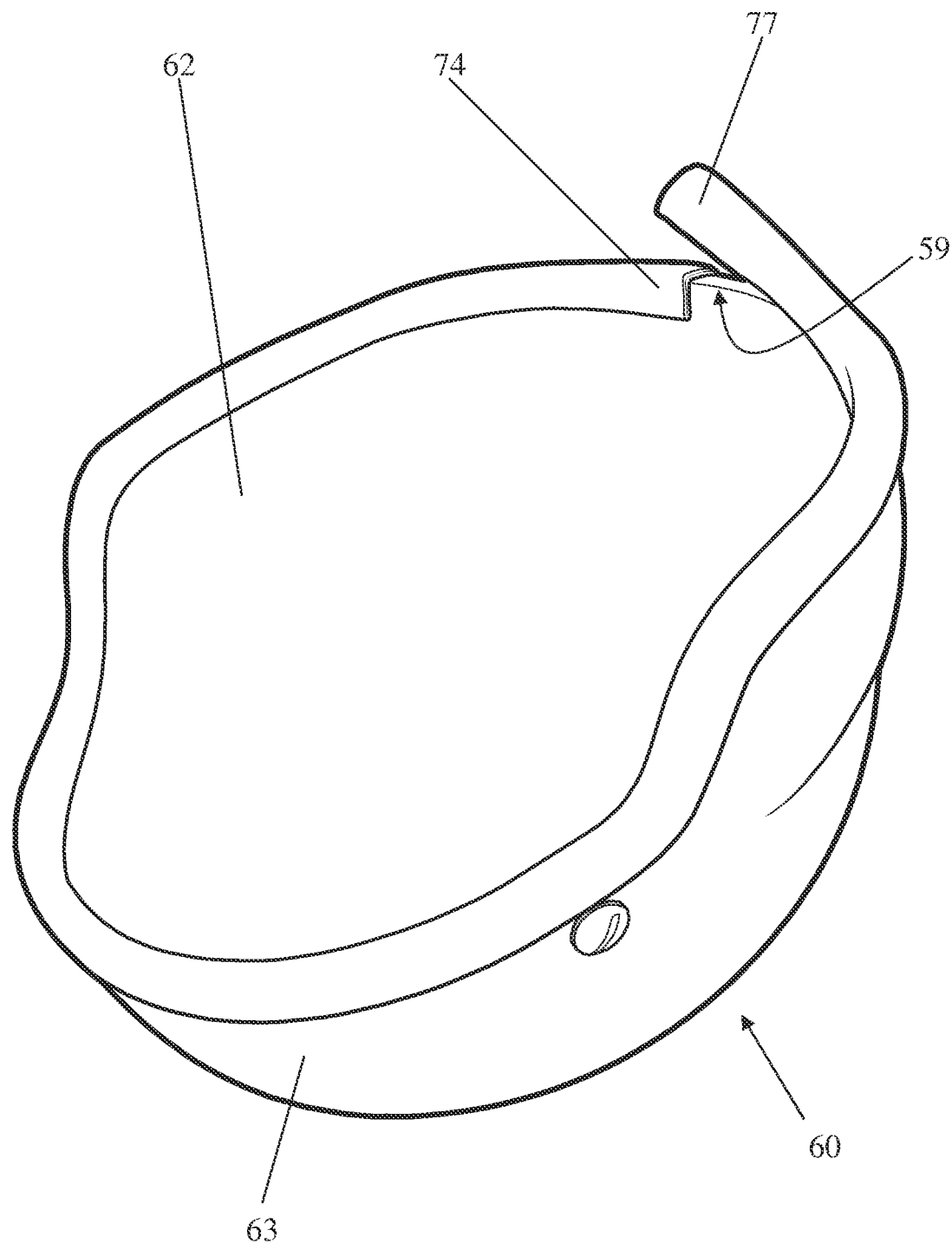
FIG. 3 is another schematic perspective view of the carbon fiber biaxial sleeve material of FIG. 1 being applied to the edge of a ballistic helmet shell.
Figure 4:
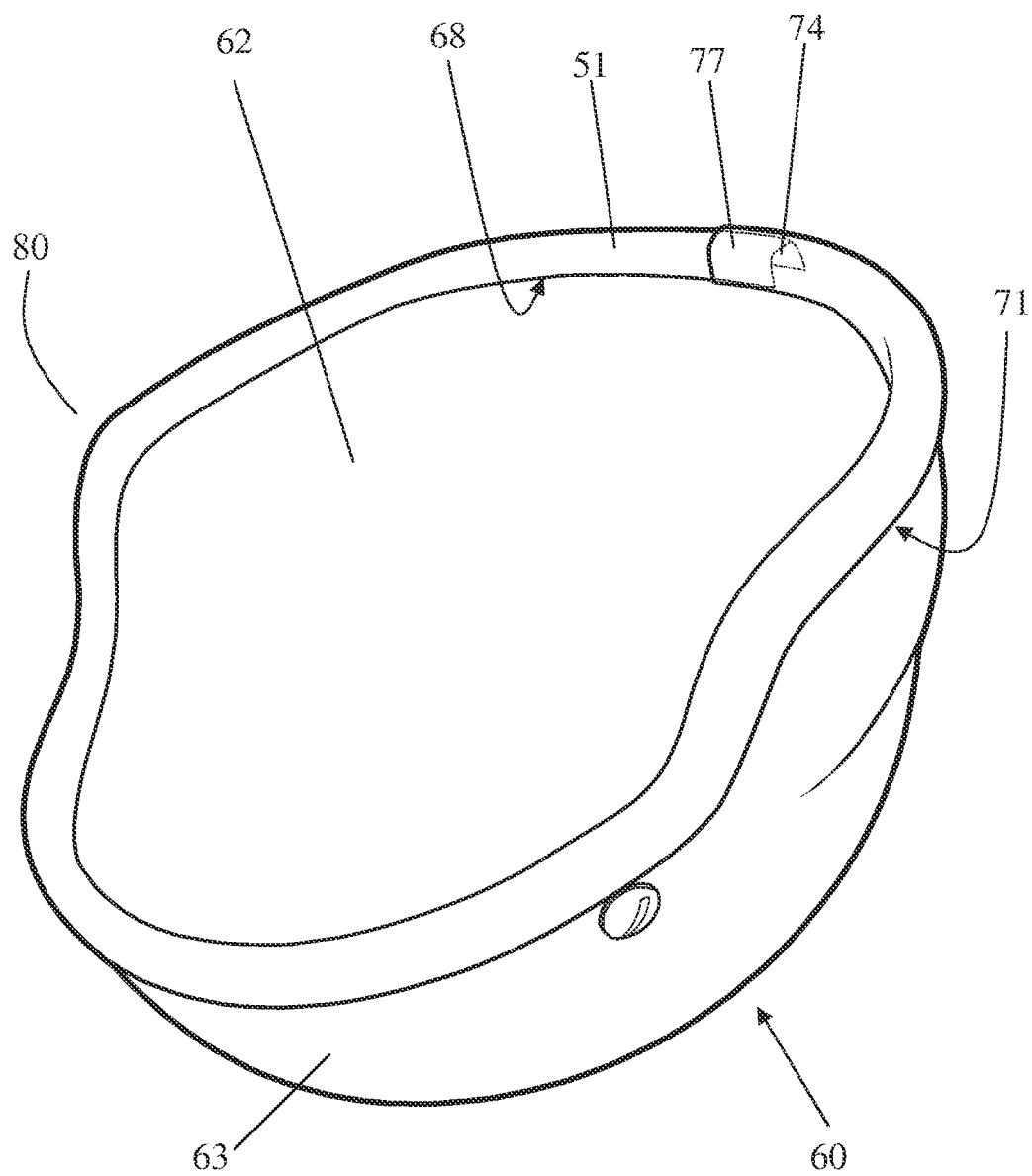
FIG. 4 is a perspective view of a ballistic helmet shell including a carbon fiber biaxial sleeve edge band, in accordance with one embodiment of the invention.

FIG. 3 shows the elongate band 51 being applied to the edge 59 of a ballistic helmet shell 60 after application of an epoxy resin matrix material to the elongate band 51 (see FIGS. 2a and 2b). The second end 77 of the elongate band 51 is slightly overlapped with the first end 74 to form a continuous edge around the perimeter of the shell 60, as shown in FIG. 4. In an alternative embodiment, the second end 77 of the elongate band 51 may abut against the first end 74 without overlapping.

In one embodiment, the epoxy resin is applied to the elongate band 51 prior to positioning the elongate band 51 on the ballistic helmet shell 60. In an alternative embodiment, the resin is applied to the elongate band 51 after the elongate band 51 has been positioned on the ballistic helmet shell 60. The elongate band 51 is held in position until the resin cures. For example, one means for holding the elongate band 51 against the edge 59 during curing is a vacuum bag which presses evenly around the full length of the elongate band 51, urging it against the edge 59 of the helmet shell 62. However, any suitable means of holding the elongate band 51 in place while the resin cures may be utilized.

FIG. 4 shows the resulting edge band 80 of the present invention as seen from the inside 62 of the helmet shell 60, in accordance with one embodiment of the invention. The edge band 80 is formed from the elongate band 51, which is held in intimately conforming contact with the edge 59 of a ballistic helmet shell 60. The inner edge 68 of the elongate band 51 is rigidly held in intimately conforming contact with the curved contour of the interior 62 of the helmet shell 60, while the outer edge 71 is rigidly held in intimately conforming contact with the curved contour of the exterior 63 of the helmet shell 60. A first end 74 of the elongate band 51 is overlapped with the second end 77 of the elongate band 51, thereby forming a continuous edge band 80 around the perimeter of the helmet shell 60.

Figure 5:
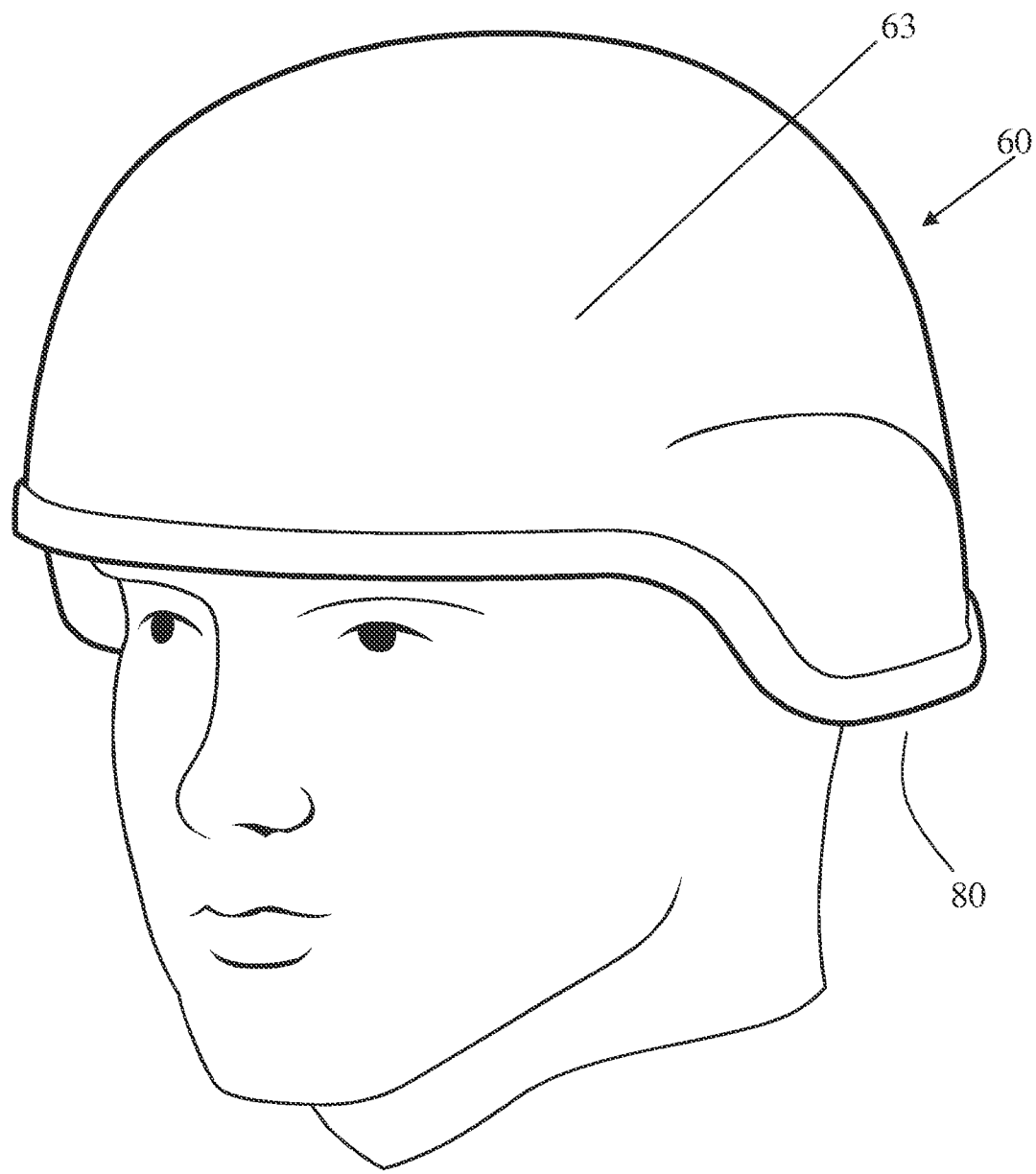
FIG. 5 is a perspective view of the ballistic helmet shell and edge band of FIG. 4 when worn by a user.

FIG. 5 shows the edge band 80 of FIG. 4 after the matrix material has cured, thereby rigidly holding the edge band to the edge of a ballistic helmet shell 60, as seen from the outside of the helmet.

It is often advantageous to use carbon fiber material for the edge band instead of a rubber-like material, because the carbon fiber protects the edge of the helmet but also adds stiffness. Alternative methods of providing stiffness to the helmet may include adding one or more layers of carbon fiber material to the helmet shell itself. However, this adds more weight and does not improve, and may in fact hurt, the ballistic performance of the shell 60.

In another embodiment, thin strips of carbon fiber material are bonded along the edge of the helmet shell 60. While this embodiment does provide increased stiffness without excessive weight, the woven elements of the material may fray and leave a jagged and uneven edge. One advantage of an elongate band constructed from a biaxial sleeve or a woven strap is that it allows for an edge band without any frayed side edges along its length. For example, an edge band including a woven sleeve will have smooth doubled-over edges, such as inner edge 68 and outer edge 71, with a double thickness of material along the perimeter of the edge of the helmet. Thus, embodiments of the invention including a folded sleeve provide an edge band that includes two layers of woven fibers that will not fray along the sides of the helmet shell. As a result, the edge band may be stronger, more durable, and more aesthetically pleasing than conventional alternatives.

In an alternative embodiment of the invention, an elongate band may be fabricated by sewing an inner and an outer hem onto flat strips of carbon fiber material. However, forming the hem includes an extra step in the manufacturing process, and the result does not provide the double thick piece of material along the edge of the helmet.

One embodiment of the invention includes a method for providing protection and added stiffness to the edge of a ballistic helmet 60. With reference to FIGS. 2-4, this method includes (i) providing a flexible woven-fiber elongate band 51 with a matrix material in contact with the elongate band 51; (ii) positioning the elongate band 51 over and holding in intimate conforming contact with an exposed edge 59 of a helmet shell 60 such that an inner edge 68 of the elongate band 51 extends upwards along an inner surface contour 62 of the helmet shell 60, and an outer edge 71 of the elongate band 51 extends upwards along an outer surface 63 contour of the helmet shell 60; and (iii) causing the matrix material to change from a flexible to a rigid state, thereby rigidly holding the elongate band 51 in intimate conforming contact with the helmet shell 60.

The matrix material may, for example, be an epoxy resin that is applied in liquid form to saturate the fibers of the elongate band 51 and then cured to rigidly bond with the fibers of the elongate band and the helmet shell 60. Alternatively the matrix material may be a thermoset or thermoplastic material which changes from a flexible state to a rigid state upon the application of heat or heat and pressure. The thermoplastic material may be woven as a fiber into the elongate band 51, applied as a powder, or injected or soaked into the fibers of the elongate band 51 in a molten state. In one embodiment, the matrix material may be substantially similar to the material of the matrix used to fabricate the helmet shell 60.

In one embodiment, the elongate band includes a woven material with smooth doubled-over edges formed, for example, by sewing hems along the length of the material, to provide a flexible woven fiber band that has no exposed fiber "ends" except at the elongate distal ends of the band. In one embodiment, a biaxial tubular sleeve is employed. In an alternative embodiment, fiber bands fabricated from any suitable weaving process such as, for example, that used in weaving fibrous straps, are employed. The fiber band is then saturated with epoxy resin, applied to the edge of the helmet shell while it is in a flexible or transition state and held in place until the resin is cured or hardened. As a result, the woven fiber band will harden in place while bonding to the helmet shell.

In one embodiment, a composite (i.e. a mixture) of the structural fibers such as carbon fiber is woven together with fibers of a fibrous thermoplastic material (e.g. nylon) to form a flexible band. The composite band is then applied to the edge of the helmet shell and held in place while applying heat or heat and pressure to cause the composite band to transition from flexible to a rigid state As a result, the woven band will harden in place while bonding to the helmet shell, which simplifies the manufacturing process while providing significant improvements in the structural properties of the edge band and helmet shell (as compared with traditional methods of forming the edge band first and then bonding it to the helmet).

For the purposes of the present invention, a "fiber" is an elongated body, the length dimension of which is much greater than the transverse dimensions of width and thickness. Accordingly, the term fiber includes monofilament fiber, multifilament fiber, ribbon, strip, a plurality of any one of combinations thereof and the like having regular or irregular cross-section.

Depending on the particular embodiment, different fibers and different matrices can be used. Useful fibers include, but are not limited to, polyolefin based polymers, e.g. ultra-high-molecular-weight polyolefin fibers including polyethylene and polypropylene fibers, aramid fibers, polyvinyl alcohol fibers and other high strength fibers. Also useful in the present invention are a variety of conventional fibers including, but not limited to, asbestos, carbon, graphite, boron, cellulose, alumina, and metal fibers, and combinations thereof.

Suitable matrix materials include, but are not limited to, polyethylenes, cross-linked polyethylenes, polypropylenes, ethylene copolymers, propylene copolymers and other olefin polymers and copolymers. Matrix materials may also include unsaturated polyesters, phenolics, polybutyrals, epoxy resins, polyurethane resins, and other low modulus resins.

In one embodiment of the invention, the proportion of matrix to fiber may range from about 5% to about 150%, by weight of fibers. Within this range, in one embodiment, composites having a relatively high fiber content, such as composites having only 10-50% matrix material, by weight of fibers, and more preferably 10-30% matrix material, may be used. In alternative embodiments, composites with higher or lower ratios of matrix to fiber may be used.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An edge band for a safety helmet, the edge band comprising:
    a folded tubular sleeve comprised of flexible woven fibers; and
    a matrix material in contact with the flexible woven fibers of the folded tubular sleeve,
    wherein the folded tubular sleeve is configured to intimately conform to a surface contour of an exposed edge of the safety helmet.

2. The edge band of claim 1, wherein the matrix material is at least one of bonded to, woven into, or embedded within the folded tubular sleeve.

3. The edge band of claim 1, wherein the matrix material is rigidified by at least one of applying heat, applying a catalyst, or curing the matrix material.

4. The edge band of claim 1, wherein the matrix material bonds the folded tubular sleeve to the exposed edge of the safety helmet.

5. The edge band of claim 1, wherein the matrix material comprises at least one of an epoxy resin, a polyurethane resin, or an unsaturated polyester resin.

6. The edge band of claim 1, wherein the matrix material comprises a thermoplastic material.

7. The edge band of claim 6, wherein the thermoplastic material comprises at least one of polyethylene, polypropylene, nylon, propylene copolymers and other olefin polymers and copolymers.

8. The edge band of claim 1, wherein the folded tubular sleeve is without frayed edges.

9. The edge band of claim 8, wherein the folded tubular sleeve comprises a plurality of carbon fibers extending substantially along an elongate axis thereof.

10. The edge band of claim 1, wherein the width of the folded tubular sleeve is greater than the thickness of an exposed edge of a helmet shell to which it is to be applied.

11. The edge band of claim 1, wherein the safety helmet has a helmet shell,
    wherein an inner edge of the folded tubular sleeve is configured to intimately conform to and extend upward along an inner surface contour of the helmet shell and an outer edge of the folded tubular sleeve is configured to intimately conform to and extend upward along an outer surface contour of the helmet shell, and wherein the edge band is configured to provide increased structural support to the helmet shell.

12. The edge band of claim 11, wherein the folded tubular sleeve comprises a biaxial fiber material.

13. The edge band of claim 11, wherein a first distal end of the edge band is configured to overlap with a second distal end of the edge band.

14. The edge band of claim 11, wherein a first distal end of the edge band is configured to abut against a second distal end of the edge band.

15. The edge band of claim 11, wherein the matrix material is rigidified so as to hold the folded tubular sleeve in intimately conforming contact with the inner and outer surface contours of the helmet shell when activated.

16. The edge band of claim 1, wherein the flexible woven fibers are comprised of carbon fibers.

\* \* \* \* \*